July 30, 1929.  T. A. BANNING, JR  1,722,653
PUMPING AND METERING APPARATUS
Filed Oct. 13, 1926   3 Sheets-Sheet 1

Inventor
Thomas A. Banning Jr.

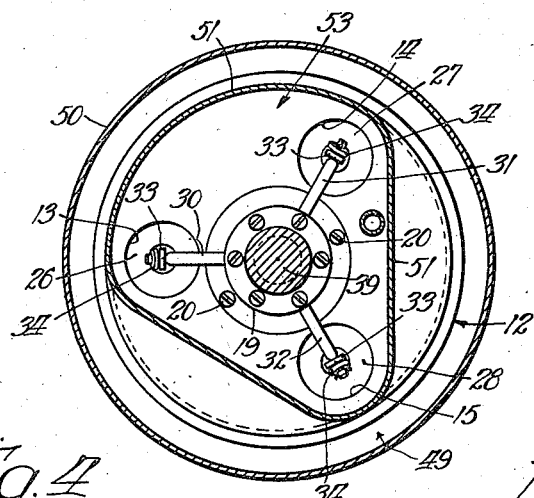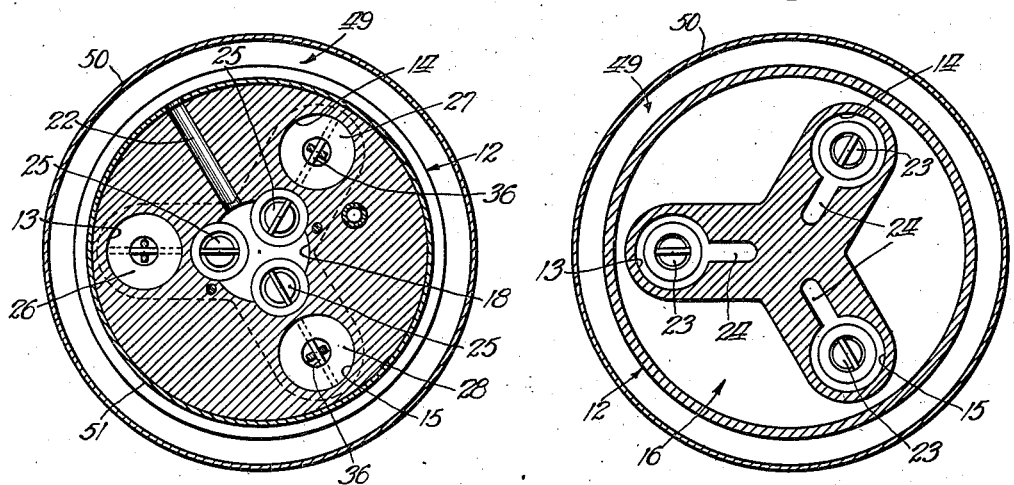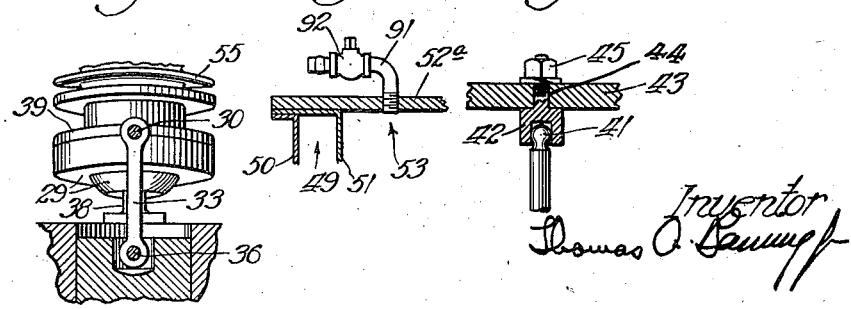

July 30, 1929.  T. A. BANNING, JR  1,722,653
PUMPING AND METERING APPARATUS
Filed Oct. 13, 1926  3 Sheets-Sheet 3

Inventor
Thomas A. Banning Jr.

Patented July 30, 1929.

1,722,653

UNITED STATES PATENT OFFICE.

THOMAS A. BANNING, JR., OF WILMETTE, ILLINOIS.

PUMPING AND METERING APPARATUS.

Application filed October 13, 1926. Serial No. 141,307.

This invention has to do with certain improvements in pumping and metering apparatus. It relates particularly to improvements in apparatus for pumping and metering fuel such as gasoline, naphtha, oil, etc., but it will presently appear that the features of the invention are not limited to the foregoing nor to any other classes of service.

The present application, as to certain features herein disclosed, is a continuation in part of my co-pending application for Letters Patent of the United States on improvements in Fuel feeding and metering systems and apparatus, Serial No. 728,209 which was filed July 25, 1924, and issued June 7, 1927, Patent No. 1,631,356. The present application also incorporates various other features of invention.

One object of the invention is to provide an arrangement which is peculiarly well adapted for the pumping and simultaneous metering of fuels used for internal combustion engines for automobiles, trucks, tractors, coaches, locomotives, motor boats, etc. It will be understood that owing to the very nature of the gasoline and similar fuels a suitable pumping device should be so constructed as to make it possible to lubricate those parts which are subject to frictional contact. One of the objects of the invention is to provide an improved construction whereby the aforementioned result may be readily secured.

A further feature of the invention relates to the provision of a construction such that in starting up the operation of the pump after it has been out of service for a long time or when it is first started on a new supply of fuel, it will very quickly and thoroughly clear itself of entrapped air, so that the operation of pumping a solid stream of liquid will commence without undue delay. In this connection it may be stated that one of the objects of the invention is to provide an arrangement such that the liquid is accurately metered at the same time that it is pumped; and in order to secure this result it should be so arranged as to clear itself of the entrapped air at the very beginning of the new pumping action. This result is secured in the present construction.

Another feature of the invention relates to the provision of means whereby the pressure exerted on the top sides of the plungers may be adjusted independently of the pressure existing on the discharge side of the apparatus. By this means it is possible to operate the pumping unit with a pressure on the top sides of the plungers which is either greater or less than the pressure on the discharge side of the apparatus as may be desired. In the aforesaid parent application, Serial No. 728,209, the top sides of the plungers may be in direct communication with the discharge side of the apparatus. In the present construction such communication may or may not be used, and in the latter case the pressure on the top sides of the plungers may be established at whatever point is desired.

Another feature of the present invention relates to a greatly simplified form of construction for operating the plungers in proper sequence. In this connection the plungers herein illustrated are operated by means of a tilting plate, said plate being pivotally supported on a ball and socket joint, and the tilting movements of said plate are dictated by means of a stem which is compelled to travel on the surface of a vertical cone. The construction of these parts is very simple and rugged.

Another feature of the invention relates to the provision of an electric motor drive for the tilting plate so that the operation thereof is dictated by the torque delivered by the electric motor. Said electric motor may be supplied with current from any suitable source as, for example, the automobile battery.

In connection with the foregoing it is an object to provide an arrangement whereby the torque delivered by the motor may be practically constant for all speeds from zero to the full normal speed of the unit. By this means the pressure of the fuel on the delivery side of the pumping unit may be substantially constant throughout the entire normal range of operating speeds. This is a very desirable feature from the standpoint of securing the best possible internal combustion engine operation.

In connection with the foregoing, one feature of the invention relates to the provision of a relatively small motor, preferably of the shunt type, and of relatively high resistance. This motor is so designed that its counter electromotive force is relatively small as compared to its resistance, even at full speed of operation. As a result thereof the torque will remain practically constant throughout the desired range of speeds and without the necessity of providing special regulating mechanisms. The use of such a motor of relatively high internal resistance also makes it possible to allow the motor to come to a dead rest when the pumping is stalled by closing the discharge passage. The resistance of the motor at such time is sufficient to prevent any abnormal flow of current and thus prevent overheating and damage even after a long interval of such stalled condition.

Another feature of the invention is the provision of means for delivering the current to the motor only during the interval that current is being delivered to the ignition system. By this means the shutting off of current supply to the ignition system is accompanied by a termination of the motor operation; and conversely when the ignition switch is closed current will also be supplied to the pumping unit. As a result of the above there is ample assurance of a constant pumping of fuel during the operation of the engine, but the pumping action will be discontinued when the engine is stopped so that the fuel pressure will be allowed to fall to zero.

The current flowing through the motor and consequently the motor torque will depend upon the voltage impressed on the motor. The fluctuation of battery voltage in automobile systems is relatively small so that this variation of motor current and consequently torque variation will also be small. In some cases, however, it will be desirable to secure a more accurate regulation of the pressure of the fuel delivered. For such purpose I have made provision for regulation of motor operation according to the pressure on the delivery side of the pumping unit.

The type of pumping unit herein disclosed is such that if the fuel is supplied to it under a pressure greater than that on the delivery side said fuel may flow directly through the valve of the pumping unit practically without obstruction. Normally, however, the fuel is drawn to the pumping unit by a suction created by the operation of the pumping unit itself.

However, I have made provision for combining the pumping unit with a fuel supply system of such arrangement that if desired the fuel may be supplied under pressure created in the supply tank, as an emergency, in which case the pumping unit being out of commission, the fuel may flow directly through the pumping unit to the carburetor.

Another feature in connection with the foregoing is the provision of a pressure pump located at a convenient point, for example the dash board, by means of which the fuel in the supply tank may, as an emergency, be placed under pressure; combined with a control valve which normally prevents the supply of compressed air from said pump to the fuel tank, said control valve being also so arranged that it normally vents the fuel supply tank to allow fuel to be drawn therefrom by the operation of the power driven fuel pump. This valve is located under seal and is normally in the venting position so that normally the system must operate by the pumping action of the power driven pump. In case of emergency said seal, however, may be broken and the valve can then be reversed so as to allow fuel to be delivered to the carburetor under hand created pressure.

Another object of the invention is to provide a construction which is very simple and rugged and may be very cheaply manufactured from a small number of parts.

Other objects and uses of the invention will appear from a detailed description of the same which consists in the features of construction and combinations of the parts hereinafter described and claimed.

In the drawings:

Fig. 3 shows a horizontal section on the line 3—3 of Fig. 1 looking in the direction of the arrows;

Fig. 4 shows a horizontal section on the line 4—4 of Fig. 1 looking in the direction of the arrows;

Fig. 5 shows a horizontal section on the line 5—5 of Fig. 1 looking in the direction of the arrows;

Fig. 6 shows a fragmentary vertical section on the line 6—6 of Fig. 1 looking in the direction of the arrows;

Fig. 7 shows a fragmentary vertical section on the line 7—7 of Fig. 1 looking in the direction of the arrows;

Fig. 8 shows a fragmentary vertical section on the line 8—8 of Fig. 2 looking in the direction of the arows;

Figure 9:
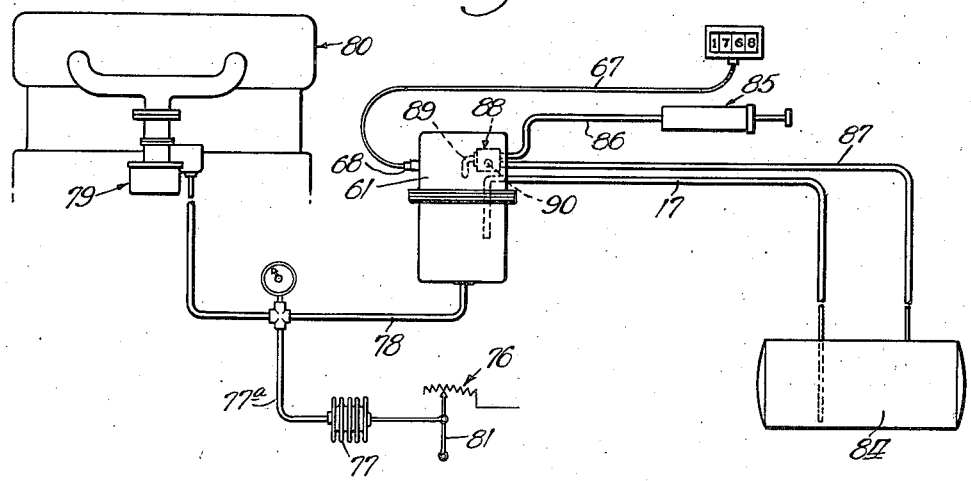
Figure 10:
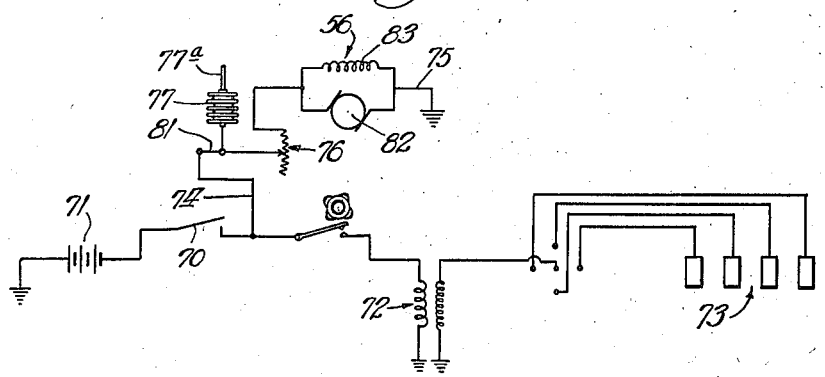

Fig. 9 shows diagrammatically one set of mechanical connections for the supply of fuel from a tank to the carburetor of an engine, and also illustrates a hand presure pump for placing the fuel in the supply tank under pressure, together with a control valve therefor, which is placed under seal within the pump unit. Fig. 9 shows also a supplemental current regulator for the motor of the pumping unit, said current regulator being operated by the pressure of the fuel delivered from the pumping unit; and Fig. 10 shows diagrammatically a set of electrical connections for delivering current to the motor of the pumping unit simultaneously with the operation of the ignition system.

Figure 1:
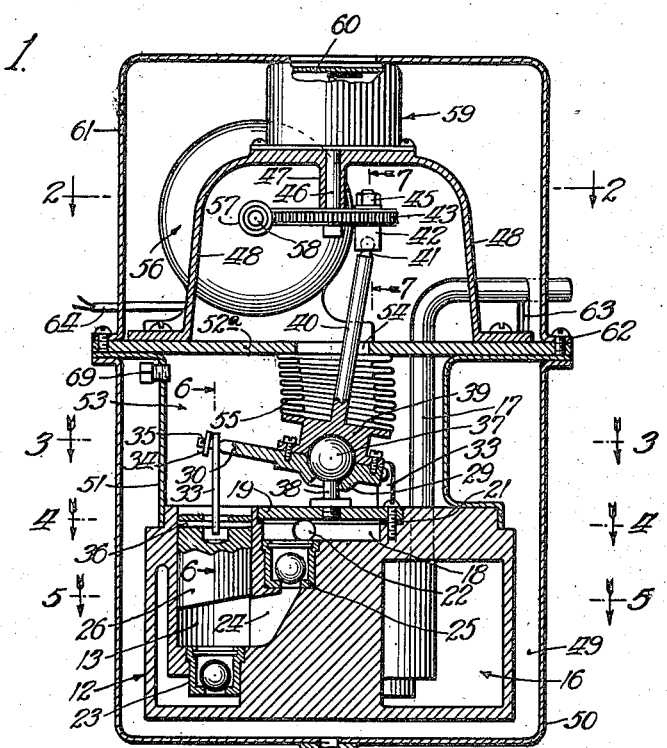
Figure 1 shows a vertical central section through a pumping unit embodying the features of the present invention.

In the particular construction illustrated in the drawings there is a cylinder block 12, preferably of circular form, and provided with three cylinder bores 13, 14 and 15, reaching downwardly from its upper surface. These cylinder bores are equi-distantly spaced. Extending around the lower portion of the block 12 is an inlet chamber 16 into which the fuel is delivered from above by a tube 17. The chamber 16 is separated from the cylinder bores but reaches beneath them as shown in Figure 1.

In the upper central portion of the block 12 is a small discharge chamber 18 which is covered over and sealed by a cap plate 19, being held in place in any convenient manner as by means of a pair of screws 20. Preferably a gasket 21 is used to establish a perfect seal for the chamber 18. This chamber 18 communicates sidewise by means of a discharge passage 22 with the space outside of the block 12 as shown in Fig. 4.

An inlet check valve 23 is set into the floor of each cylindrical chamber, preferably being set into place from above. Reaching inwards from each of the cylindrical bores is a discharge passage 24; and a discharge check valve 25 is placed between each of the passages 24 and the chamber 18. In connection with the above it will be noted that each of the passages 24 reaches upwards as it passes away from the cylinder bore; also that each of these discharge passages 24 has a port of considerable vertical dimension.

The plungers 26, 27 and 28 work within the cylinder bores 13, 14 and 15 respectively. The plungers are of considerable vertical or axial dimensions as compared to the maximum length of stroke. Preferably also, the bottom faces of the plungers are sloped upwards towards the locations of the discharge ports 24. Furthermore, the parts are so proportioned that when the plungers are working with a maximum length of stroke their bottom faces do not rise appreciably above the top edges of the corresponding discharge ports 24. Such a condition is illustrated in Fig. 1 where the plunger 26 is shown at its highest position when operating with a maximum length of stroke. When the plunger 26 moves to its lowest position when operating with the maximum stroke it does not quite reach the bottom of the cylinder bore; and for intermediate lengths of stroke it does not rise as high nor fall as low as for the maximum stroke.

In view of the above circumstances when the pumping action is first started up after the pump has been run dry, the entrapped air will be completely discharged upwards through the discharge ports during the first two or three strokes, so that thereafter the pump will continue to deliver a perfectly solid stream of liquid without any entrapped air. The discharge passage 22 being at the highest point will insure initial delivery of the entrapped air out of the system before the flow of liquid commences.

In the arrangement illustrated the various plungers are reciprocated in sequence by a very simple drive. The same includes a central block 29 having radially extending arms 30, 31 and 32 corresponding to the three plungers. These arms are connected to their respective plungers by means of links such as 33 of Fig. 6. The upper end of each of these links is set on to the end of the corresponding stem 30, 31 or 32 and is held in place by a rather small washer 34 and pin 35. The lower end of each link is pivotally connected to its plunger by means of a through pin 36 extending across a socket in the upper end of the plunger as illustrated in Figs. 1 and 6. Sufficient play is allowd between the ends of the links 33 and their respective connections to take care of necessary angularity in movement; but the arrangement is such that the plungers cannot move appreciably up or down without corresponding movement of the stems.

Since the various plungers are of considerable vertical dimension they are amply guided in their reciprocation to avoid binding in the cylinders and to give ample sealing surface with respect to the cylinders.

The block 29 has on its top surface a hemispherical recess which sets against the bottom portion of a ball 37 formed on the upper end of a stem 39. This stem is screwed down into the block 19 already referred to and which thereby establishes a rigid support.

A companion block 39 has a hemispherical recess on its bottom face and may be secured to the block 29 by screws as shown in Fig. 1. The two blocks together establish a ball and socket joint for the rocking gyratory movement of the tilting plate; and the bottom block 29 has a central opening of sufficient size to allow for the necessary amount of tilting action.

A central stem 40 reaches upwards from the block 39 at right angles thereto and its upper end is preferably rounded as shown at 41 in Fig. 7. This rounded upper end works nicely within a recess in the bottom face of a block 42 which block is adjustably secured to a worm gear wheel 43.

Such adjustment is possible by passing the stem of the block throuh a radial slot 44 of the worm gear wheel 43, and then locking the parts solidly together by a nut 45 threaded onto the upper end of said stem.

The worm gear wheel 43 is carried by the lower end of a stub shaft 46, said stub shaft being journaled at 47 in a bracket 48. The stub shaft 46 is preferably aligned with the ball and socket joint already referred to so that upon rotating the worm gear wheel the stem 40 will be compelled to travel on the surface of a cone, the radius of which cone is established by the radial position of the block 42. Furthermore, by rotating the worm gear wheel the block 29 is compelled to oscillate with a gyratory and tilting movement in such manner that the various plungers are caused to reciprocate in succession.

The discharge passage 22 already referred to reaches into a chamber 49 which surrounds the block 12. The lower portion of said chamber is established by means of a sheet metal cup 50 of slightly larger size than the block 12.

Reaching upwards from the block 12 is another sheet metal partition 51 whose upper end is flared out into a horizontal flange and receives the upper edge portion of the cup 50. In this way the upper portion of the chamber 49 is established and sealed. A discharge nipple 52 is connected into the lower central portion of the cup 50 to allow delivery of the fuel under pressure.

The plate 52$^a$ extends over the partition 51, thereby establishing a sealed chamber 53 within which the tilting plate and companion parts operate. This plate 52$^a$ has a central opening 54 through which reaches the stem 40, said opening being of sufficient size to allow the stem to travel in its maximum conical movement.

A bellows 55 extends between the block 39 and the plate 52$^a$ so as to establish a flexible sheet metal seal at the central portion of the chamber 53. In this way the stem 40 is allowed to perform its conical travel while at the same time keeping the chamber 53 sealed from the outside atmosphere.

As a matter of convenience in construction the bracket 48 already referred to is mounted upon the top of the plate 52$^a$.

The bellows 55 will prevent the tilting plate and blocks from rotating about a vertical axis so that the stems 30 and 31 and 32 are compelled to travel up and down within closed orbits such as ellipses or circles. The link connections already described will allow the necessary elliptical or circular movements to be performed.

The driving motor 56 is conveniently located on the top face of the plate 52$^a$ and drives the worm gear 43 through the medium of a worm 57 located directly on the motor shaft 58. A suitable counting device may be connected either to the stub shaft 46 or to the motor shaft 58, said counting device counting either in revolutions or in gallons or other suitable units. In the construction illustrated a counting device 59 is placed on top of the bracket 49 and is operated directly by the shaft 46. This counting device 59 preferably reads in gallons and has a top dial visible through a window 60 in the top of the counting device. A spun or drawn sheet metal cup 61 is preferably set down over the counting device and other mechanisms so as to enclose the same and protect them from damage or tampering. This cup may have a bottom flange 62 whereby it is secured to the plate 52$^a$. Notches or slots 63, etc. allow the cup 61 to be set in place or removed without interference either with the inlet pipe 17 or the electric wires 64 which supply current to the motor.

If desired small seals 65 and 66 may be provided for sealing the cup 61 in place, said seals being formed of short lengths of wire together with lead blocks whereby the ends of the wire links are sealed together. These wires are passed through perforations in the flange 62 and in the plate 52$^a$ as will be readily apparent from examination of Figs. 1 and 2.

If desired a counting device may be directly connected to the motor shaft by means of a piece of flexible wire such as piano wire or the like 67 and a coupling 68, the motor shaft extending slightly beyond the cup 61 to allow its connection being readily made.

It will be understood that the displacement effected by a complete cycle of movements equivalent to a complete rotation of the gear 43 will depend upon the exact radial position of the block 42 in the slot 44. By proper calibration the device can be accurately adjusted so that the counting devices will accurately read in the desired units such as gallons. Having established this calibration the cup 61 may be sealed in place so as to prevent tampering with the device by unauthorized persons.

As soon as the pumping action commences liquid will be delivered into the chamber 49 and will accumulate therein, rising in said chamber and thereby compressing the air into the upper portion of the chamber. If the chamber 49 is completely isolated from the chamber 53 (such condition being illustrated in Fig. 1 wherein a plug 69 closes a port in the upper end of the partition 51), there will soon arrive a time when the back pressure thus developed in the chamber 49 is sufficient to stall the motor 56. It will be understood that the torque delivered by said motor depends upon the current and voltage supplied to it as well as other characteristics; and it is possible to so proportion the motor characteristics that the stalling of the pump will take place at the desired back pressure. Thereupon the pumping action will cease until such time as some liquid has been withdrawn from the chamber 49 thereby lowering the back pressure and allowing the pump to commence operation. When there is a continued demand for liquid delivered from the nipple 52 the pumping operation will continue at such rate as to supply said demand and the pressure delivered will be dependent upon the motor characteristics.

Referring to Figs. 9 and 10 I have shown the motor 56 as being connected to the ignition circuit of the system in such a way that the closing of the ignition switch 70 for the supply of current from the battery 71 to the ignition coil 72 for the spark plugs 73, will be accompanied by a simultaneous supply of current to the motor 56. For this purpose a lead 74 is connected to the ignition circuit at a point beyond the switch 70 and delivers current to one side of the motor, the other side of the motor being grounded by the lead 75. Preferably a rheostat 76 is placed in the lead 74 in order to facilitate the initial adjustment of the system.

In Figs. 9 and 10 I have shown a small pressure operated bellows 77 which is connected to the pipe 78 which delivers fuel from the pumping device to the carburetor 79 of the internal combustion engine 80. This bellows is shown as connected to the lever arm 81 which controls the rheostat 76 whereby as the pressure in the delivery line 78 rises the resistance of the rheostat is increased to thereby reduce the current supplied to the motor 56. This constitutes a mechanical control of the motor current for the purpose of making a substantially constant pressure on the delivery side of the system. A manual control of the rheostat 76 could also be used in place of the automatic mechanically operated control just referred to.

It is possible to so design the motor 56 that the same will have a practically constant torque throughout a wide range of speeds, thus ensuring a practically constant pressure of liquid on the delivery side of the system with different speeds of delivery. For example, by making the motor 56 a small shunt motor including the armature 82 and field coil 83 in parallel, and by making the armature circuit of relatively high resistance it is possible to make the I. R. drop through the armature circuit large as compared to the counter electro-motive force of the armature at the normal maximum speed of operation. Under these circumstances there will be only a slight change of current flowing through the armature throughout the desired range of speeds from standstill to normal full speed, thus making it possible to secure a practically uniform torque for all speeds.

Furthermore, a motor designed as just above explained presents the additional advantage for the present service, that at standstill the motor will only consume a small amount of current, thus reducing the drain on the battery, avoiding possible overheating after a long interval of time at standstill.

Experience also demonstrates the fact that the amount of current necessary to operate such a pumping device is very small, for example one or two amperes at six volts for the supply of fuel to an automobile internal combustion engine having a very inefficient drive, so it is conveniently possible to design the motor of small size and having the characteristics already explained.

Examination of Fig. 1 in particular will show that when fuel is supplied through the pipe 17 under pressure greater than the pressure existing in the discharge chamber 49 said fuel can flow directly past the check valves 23 and 25 and directly through the cylinders without the necessity of operating the pumping device. I avail myself of this fact for the purpose of making possible an emergency operation which I will now explain in detail;

In Fig. 9 I have shown the main fuel supply tank diagrammatically at 84. It supplies fuel to the inlet pipe 17; and normally the fuel is drawn by the pumping and metering device through the pipe 17 by the suction created by the operation of the plungers. If for any reason the motor 56 should fail to function properly or the system should become otherwise disabled, the fuel in the tank 84 may be placed under a positive pressure and the fuel thus forced through the pumping device and past the check valves to the pipe 78 and thence to the carburetor of the engine. For this purpose I have illustrated a small hand air pump 85 located at a convenient point, for example near the dash board, and connected to the tank 84 by pipes 86 and 87. A three-way valve 88 is shown intermediate between the pipes 86 and 87, said three-way valve including the operating handle 89 and the vent port 90. When the valve is turned into the position illustrated in Fig. 9 it vents pipe 87 so that as fuel is drawn from the tank 84 by operation of the pumping, air is allowed to enter said tank in the well understood manner. By turning the valve 89 to another position the vent port 90 is closed and the pipes 86 and 87 are connected directly together and compressed air may then be supplied to the tank 84 by pump 85. Thenceforth the fuel can be supplied to the carburetor by forcing it directly through the pumping and metering device but without operation of the latter.

Figure 2:
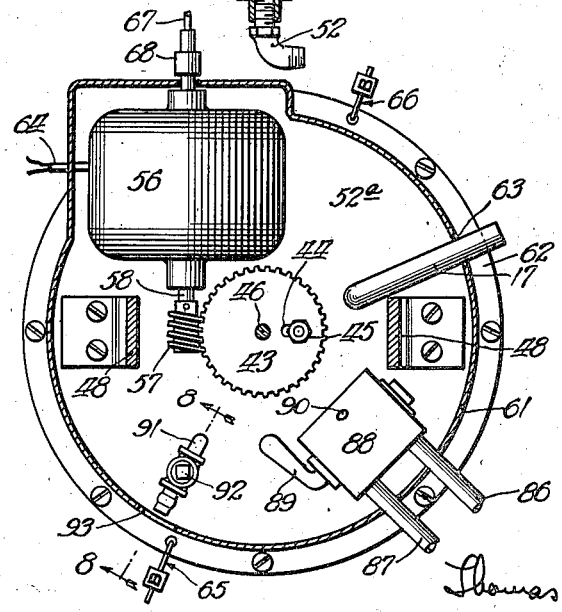
Fig. 2 shows a horizontal section on the line 2—2 of Fig. 1 looking in the direction of the arrows, and also illustrates an emergency valve located in the upper compartment under seal.

Ordinarily the valve 89 should be left in the venting position since it is desired that the entire quantity of fuel supplied to the engine should be metered. I therefore place the valve 88 under the cup 61 as illustrated in Fig. 2, leading the pipes 86 and 87 through suitable slots in said cup. Then when the cup is sealed by the seals 65 and 66 the valve is protected and can not be tampered with except by breaking the seal. If the driver should find it necessary to turn the valve in order to use the emergency system of operation he may break the seals and reach the valve for this purpose, but by so doing he will leave a definite indication of the fact that the valve has been operated because he will have broken the seal.

By placing the space 53 under pressure equal to that existing in the discharge chamber 49 it is possible to operate the pumping and metering device according to the system of operation disclosed in my aforesaid co-pending application Serial No. 728,209; and also according to the method of operation disclosed in my co-pending application Serial No. 121,573 which was filed July 10, 1926. For this purpose I prefer to place lubricating oil within the lower portion of the chamber 53 which oil will ride up and down on the top sides of the plungers and effectively lubricate them in their movements in the cylinders, said oil also lubricating the ball and socket joint and other moving parts.

In some cases it may be desirable to subject the chamber 53 to a pressure either greater or less than that existing in the discharge chamber 49. For example, where the pressure in the chamber 49 is subject to wide fluctuations, never exceeding however a relatively small amount of, say, one or two pounds per square inch, it may be desirable to place a definite pressure of, say, two pounds per square inch in the chamber 53 and maintain said pressure therein continuously.

For such purpose a plug 69 may be inserted in the port in the upper portion of the partition 51 so as to definitely isolate the chamber 53 from the chamber 49. A nipple 91 may then be connected into the partition 52$^a$, said nipple having a small valve 92 whereby it may be closed. An opening 93 in the cup 61 is in line with the nipple 91 so that a small hose can be connected to the nipple for the introduction of oil or compressed air through the nipple. Thereupon the valve 92 may be closed. For example, if the chamber 53 be filled with oil to a depth of approximately one-fifth its volume, there will be established therein a pressure of substantially three pounds per square inch.

From the above it is evident that the present device can be used with a system of operation wherein the pressure on the top sides of the plungers is either equal to, greater than or less than the pressure on the discharge side of the system.

While I have herein shown and described only a single embodiment of the features of my present invention, still I do not intend to limit myself thereto except as I may do so in the claims.

I claim:

1. In a liquid displacement apparatus the combination of a base block having therein a plurality of vertically extending cylinder bores located equidistant around a common center, an inlet port in the bottom of each of said cylinder bores, an inlet check valve for each inlet, a discharge port reaching sidewise and upwards from each cylinder bore and having a vertical dimension sufficient to accommodate the maximum plunger strokes and having its upper edge at an elevation substantially equal to the highest position of the bottom face of the corresponding plunger, a discharge check valve leading upwards from each discharge port to a delivery chamber, a plunger in each cylinder bore having its lower face slanting upwards towards the position of the discharge port whereby entrapped air will be delivered from the cylinder upwards through the discharge port during the first plunger movements and when operating with maximum plunger strokes, each plunger having a vertical dimension sufficient to establish a satisfactory bearing for the plunger within the cylinder to avoid binding and also to prevent uncovering of the discharge port during maximum plunger movements, and means for reciprocating all of the plungers in succession, said means comprising a member located centrally with respect to all the plungers, a ball and socket joint whereon said member may be reciprocated with a gyratory motion, a central stem on said member, and means for causing said stem to travel over the surface of a cone of determined size, substantially as described.

2. In a liquid displacement apparatus the combination of a base block having therein a plurality of vertically extending cylinder bores located equidistant around a common center, an inlet port in the bottom of each of said cylinder bores, an inlet check valve for each inlet, a discharge port reaching sidewise and upwards from each cylinder bore and having a vertical dimension sufficient to accommodate the maximum plunger strokes and having its upper edge at an elevation substantially equal to the highest position of the bottom face of the corresponding plunger, a discharge check valve leading upwards from each discharge port to a delivery chamber, a plunger in each cylinder having its lower face slanting upwards towards the position of the discharge port whereby entrapped air will be delivered from the cylinder upwards through the discharge port during the first plunger movements and when operating with maximum plunger strokes, each plunger having a vertical dimension sufficient to establish a satisfactory bearing for the plunger within the cylinder to avoid binding and also to prevent uncovering of the discharge port during maximum plunger movements, and means for reciprocating all of the plungers in succession, substantially as described.

3. In a liquid displacement apparatus the combination of a base block having therein a plurality of vertical cylinder bores, plungers working in the cylinder bores, an inlet port and check valve in the lower portion of each cylinder bore, a discharge port reaching sidewise from each cylinder bore and having its upper edge at an elevation substantially the highest point of plunger movement, a discharge check valve above each of said discharge ports, the lower portion of each plunger being suitably formed to discharge air upwards towards the position of the discharge port, and means for actuating all of the plungers in desired timing and with strokes such that the bottom faces of the plungers travel within ranges of movement not higher than the positions of the corresponding discharge ports, substantially as described.

4. In a liquid displacement apparatus the combination of a plurality of vertical displacement cylinders, an inlet port reaching into the lower portion of each cylinder, an inlet check valve for each of said ports, a plunger within each cylinder, a discharge port reaching sidewise from each cylinder and having its upper edge located substantially as high as the highest position attained by the bottom face of the plunger corresponding to maximum plunger movement, the lower portion of each plunger being suitably formed to normally discharge entrapped air upwards towards the discharge port, a discharge check valve above each discharge port, a plunger within each cylinder, and means for actuating all of the plungers in desired timing, substantially as described.

5. In a liquid displacement apparatus the combination of a plurality of vertical cylinders, an inlet port leading into the lower portion of each cylinder, a discharge port leading sidewise and upwards from each cylinder, a discharge check valve above the position of each discharge port, each discharge port having its upper edge located substantially as high as the higest position attained by the bottom face of the plunger corresponding to maximum plunger movement, and each discharge port being of sufficient vertical dimension to maintain communication with its cylinder during the entire plunger movement below such highest position, a plunger within each cylinder, and means for actuating all of the plungers in desired timing, substantially as described.

6. In a liquid displacement apparatus, the combination of pumping means including a plurality of vertical cylinders, inlet and outlet connections and check valves therefor, plungers in said cylinders, means for reciprocating said plungers vertically for the pumping action, a chamber enclosing the reciprocating means, and the space above the plungers, and a valved nipple in the wall of said chamber substantially as described.

7. In a liquid displacement apparatus, the combination of a vertical cylinder, a plunger therein, inlet and discharge connections and check valves to said cylinder, a chamber enclosing the space above the plunger, and means for controlling the pressure within said chamber substantially as described.

8. In a liquid displacement apparatus, the combination of a vertical cylinder, a plunger working therein, inlet and discharge connections and valves to said cylinder, a chamber enclosing the space above the plunger, means for driving the plunger from without said chamber, and a pressure retaining connection leading into said chamber substantially as described.

9. In a liquid displacement apparatus, the combination of a cylinder, a plunger working therein, inlet and discharge connections and valves to said cylinder, means for enclosing a chamber around that portion of the cylinder opposite to the positions of said inlet and discharge connections, means for driving the plunger from without said chamber, and a valved connection leading into said chamber substantially as described.

10. In a liquid displacement apparatus, the combination of a cylinder, a plunger working therein, inlet and discharge connections and valves to said cylinder, means for enclosing a chamber around that portion of the cylinder opposite to the positions of said inlet and discharge connections, means for driving the plunger, and a valved connection leading into said chamber substantially as described.

11. In a liquid displacement apparatus, the combination of a cylinder, a plunger working therein, inlet and discharge connections and valves to said cylinder, means for enclosing a chamber around that portion of the cylinder opposite to the positions of said inlet and discharge connections, means for driving the plunger, and means for controlling the pressure within the chamber substantially as described.

THOMAS A. BANNING, Jr.